United States Patent
Kassardjian et al.

[11] Patent Number: 5,946,871
[45] Date of Patent: *Sep. 7, 1999

[54] REINFORCING BAR PROTECTIVE COVER

[75] Inventors: Vasken Kassardjian, Newport Beach; Patrick Joseph Wilson, Dove Canyon, both of Calif.

[73] Assignee: Don De Cristo Concrete Accessories, Inc., Irvine, Calif.

[*] Notice: This patent is subject to a terminal disclaimer.

[21] Appl. No.: 08/893,572

[22] Filed: Jul. 11, 1997

Related U.S. Application Data

[62] Division of application No. 08/567,166, Dec. 5, 1995, which is a division of application No. 08/322,160, Oct. 13, 1994, Pat. No. 5,523,043, which is a division of application No. 08/245,018, May 18, 1994, Pat. No. 5,381,636.

[51] Int. Cl.⁶ ................ E04H 12/00; E05B 1/00
[52] U.S. Cl. ............... 52/301; 52/300; 52/289.1; 52/689; 138/96 R; 248/523
[58] Field of Search .............. 52/300, 301, 289, 52/689, 687, 688, 704; 138/96 R; 74/553, 551.1, 551.9; 16/117, 118, 121; 135/86, 77

[56] References Cited

U.S. PATENT DOCUMENTS

| | | | |
|---|---|---|---|
| Re. 33,764 | 12/1991 | Cochrane | 215/232 |
| D. 262,093 | 12/1981 | Bush et al. | D8/386 |
| D. 363,657 | 10/1995 | Kassardjian et al. | D8/354 |
| 1,083,120 | 12/1913 | May . | |
| 2,131,319 | 9/1938 | Greenholtz et al. | 264/268 |
| 2,215,251 | 9/1940 | Prince | 138/96 |
| 3,007,776 | 12/1961 | Parkin | 287/53 |
| 3,199,819 | 8/1965 | Widmark | 248/188.9 |
| 3,233,502 | 2/1966 | Fernberg | 85/80 |
| 3,485,271 | 12/1969 | Halsey | 138/96 |
| 3,693,310 | 9/1972 | Middleton | 52/689 |
| 3,890,990 | 6/1975 | Schafer | 135/20 |
| 4,000,539 | 1/1977 | Meyer | 74/553 |
| 4,012,806 | 3/1977 | Howie, Jr. | 74/553 |
| 4,080,770 | 3/1978 | Vigh | 52/689 |
| 4,119,290 | 10/1978 | Gies | 248/523 |
| 4,140,451 | 2/1979 | Herozina, Jr. et al. | 264/268 |
| 4,179,771 | 12/1979 | Ramkins et al. | 16/121 |
| 4,202,378 | 5/1980 | Bush et al. | 138/96 |
| 4,269,010 | 5/1981 | Glass | 52/298 |
| 4,338,270 | 7/1982 | Uffindell | 264/268 |
| 4,575,978 | 3/1986 | Huhn et al. | 52/301 |
| 4,644,726 | 2/1987 | Wheeler | 52/67 |
| 4,655,023 | 4/1987 | Yung | 52/689 |
| 4,694,863 | 9/1987 | Klopp | 138/96 |
| 4,824,136 | 4/1989 | Baxter | 248/189 |
| 4,833,850 | 5/1989 | Lunn | 52/301 |
| 4,939,830 | 7/1990 | Janian | 29/173 |
| 4,965,035 | 10/1990 | Ishiwatari et al. | 264/268 |
| 4,972,642 | 11/1990 | Strobl, Jr. | 52/298 |
| 5,037,595 | 8/1991 | Kornelis | 264/268 |
| 5,313,757 | 5/1994 | Schnepf | 52/301 |
| 5,363,618 | 11/1994 | Underwood | 52/301 |
| 5,447,290 | 9/1995 | Workman | 256/59 |
| 5,568,708 | 10/1996 | Kassardjian et al. | 52/301 |
| 5,613,336 | 3/1997 | Workman | 52/301 |

FOREIGN PATENT DOCUMENTS

| | | |
|---|---|---|
| 1157436 | 11/1963 | Germany . |
| 1810356 | 6/1970 | Germany . |
| 2534928 | 2/1976 | Germany . |
| 4036919 | 11/1990 | Germany . |
| 91/14839 | 10/1991 | WIPO . |

OTHER PUBLICATIONS

Don De Cristo Concrete Accessories, Inc. Catalog, "Plastic Rebar Guard", p. 43.
Deslauriers, Inc. Brochure, "Deslauriers Impalement–Protection Safety Cap DISC System".

*Primary Examiner*—Carl D. Friedman
*Assistant Examiner*—Winnie S. Yip
*Attorney, Agent, or Firm*—Fitzpatrick, Cella, Harper & Scinto

[57] ABSTRACT

A protective cover for concrete reinforcement bars includes an elongated cylindrical collar for securing the protective cover to an exposed end of a concrete reinforcing bar, a cap which is perpendicularly attached to the collar by reinforcing ribs, and a metal seat arranged between the collar and the cap and having slots for permitting direct attachment of the reinforcing ribs from the collar to the cap.

24 Claims, 3 Drawing Sheets

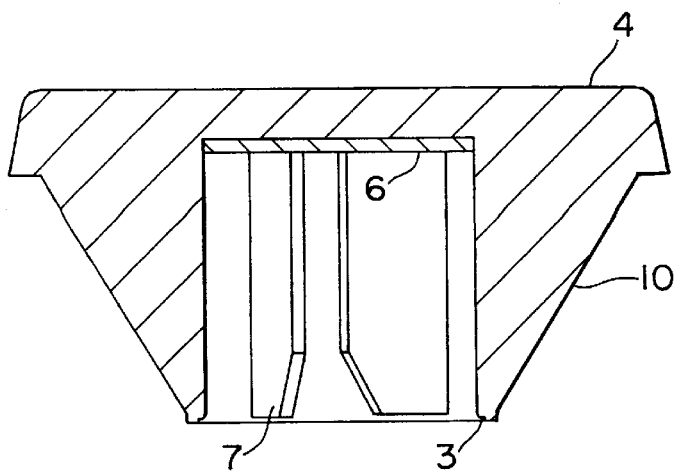
FIG. 5
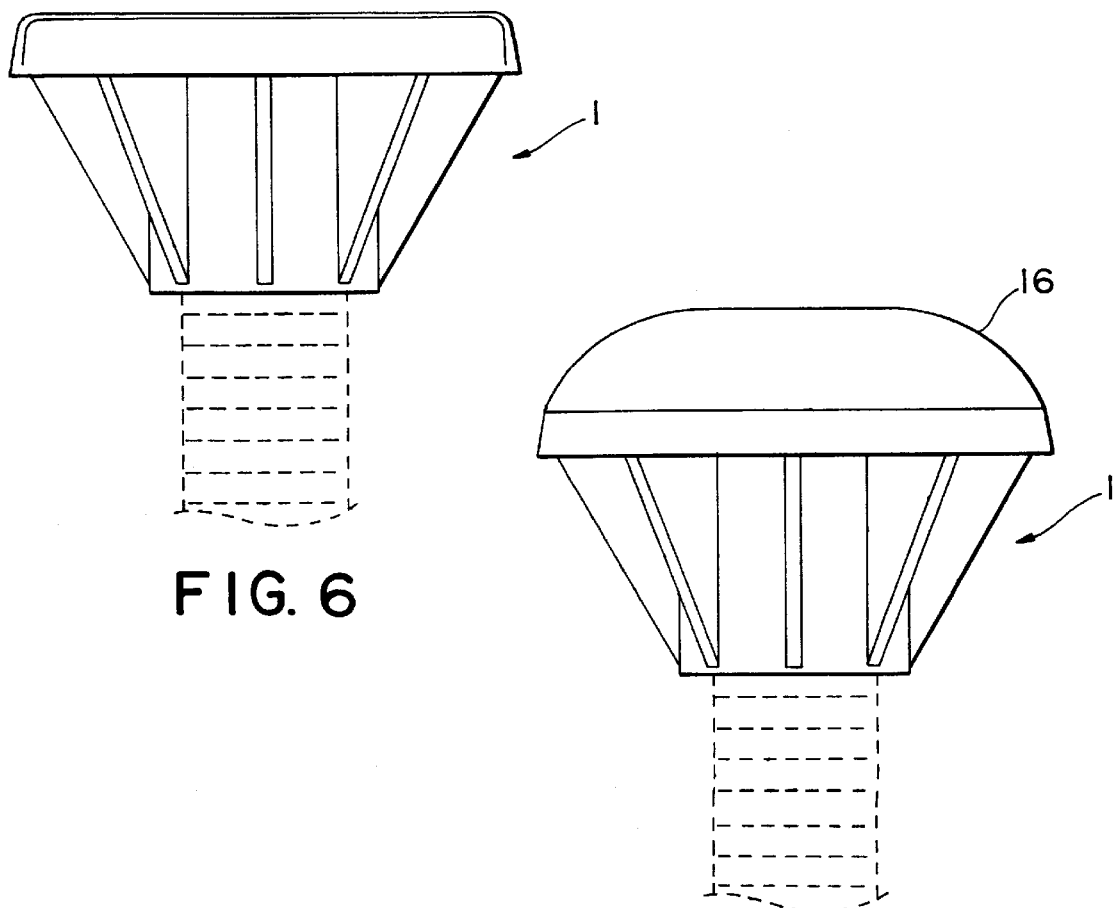
FIG. 6
FIG. 7

REINFORCING BAR PROTECTIVE COVER

This application is a division of application Ser. No. 08/567,166 filed Dec. 5, 1995, pending, which is a division of application Ser. No. 08/322,160 filed Oct. 13, 1994, now U.S. Pat. No. 5,523,043, which is a division of application Ser. No. 08/245,018, filed May 18, 1994, now U.S. Pat. No. 5,381,636.

BACKGROUND OF THE INVENTION

1. Field of the Invention

The present invention relates to a protective cover for projecting ends of rods and more particularly, to a protective cover used during construction for placement over the projecting ends of steel reinforcing bars.

2. Description of the Related Art

Typically, concrete structures, such as an office building or a highway overpass, include steel reinforcing bars which are placed within concrete forms prior to pouring the concrete. During construction, these steel reinforcing bars, which often are oriented in both horizontal and vertical directions, pose a safety hazard. For example, workers at grade level may be stabbed or gouged by the exposed ends of the reinforcing bars. More unfortunately, workers above grade, such as on scaffolding, may fall and become impaled on top of vertically-rising reinforcing bars.

In an attempt to reduce injury to workers, conventional safety caps, such as the type disclosed in U.S. Pat. No. 4,202,378, have been designed to protect workers from being scraped or stabbed by the projecting ends of reinforcing bars. However, because of the greater forces involved when a worker falls onto vertically-rising reinforcement bars, conventional safety caps do not prevent a falling worker from being impaled on a reinforcing bar, or on the cap and bar itself. That is, conventional safety caps were designed only to prevent a worker from being scratched or stabbed by the sharp ends of the projecting reinforcing bar.

Realizing the dangers presented by exposed ends of reinforcing bars at a construction site and realizing that conventional safety caps do not prevent a worker from being impaled, both federal and state divisions of the Occupational Safety and Health Standards Board (OSHA) have recently proposed new safety standards requiring the use of protective covers for covering the exposed ends of reinforcing steel bars so as to prevent injury and impalement. The proposed standard provides that workers working at grade, above grade, or at any surface and exposed to reinforcing steel or other projections shall be protected against the hazard of impalement by guarding the exposed protruding end of the reinforcing bar with a protective cover. The OSHA standard requires that the protective cover be made of wood, plastic, or any similar material, and should be capable of withstanding, at a minimum, the impact of a 250-pound weight dropped from a height of 10 feet without penetration failure of the cover, and that the surface area of the protective cover shall be a minimum of a 4"×4"-square surface area. This proposed OSHA standard for protective covers is believed to provide substantial protection for workers at a construction site. Heretofore, conventional safety caps do not meet the new OSHA standard.

SUMMARY OF THE INVENTION

The present invention provides a protective cover which is adapted to cover the exposed ends of concrete reinforcing bars or other projections so as to prevent impalement and which is believed to meet both present and proposed OSHA standards for protective covers. According to the invention, the improved protective cover comprises an elongated cylindrical collar for securing the cover to the exposed end of a concrete reinforcing bar, a cap which is perpendicularly attached to the collar by reinforcing ribs, and a metal seat for seating against the end of the reinforcing bar and which is arranged between the collar and the cap. The metal seat has slot-shaped cut-out regions for permitting direct attachment of the reinforcing ribs from the collar to the cap.

Advantageously, the protective cover of the present invention not only provides workers with protection from being stabbed or gouged by an exposed end of a reinforcing bar, but also provides protection from impalement on a reinforcing bar. Specifically, since the protective cover includes a metal seat which seats against the reinforcing bar, the impact of a worker falling on the protective cover will not cause a penetration failure of the cover. In addition, since the protective cover is integrally formed around the metal seat, the cap and collar will not separate causing a penetration failure of the protective cover.

BRIEF DESCRIPTION OF THE DRAWINGS

FIG. 5 is a longitudinal section of the protective cover taken along line 5—5 of FIG. 3;

FIG. 6 is a side elevational view of the protective cover according to the present invention as shown in use on a reinforcing bar; and FIG. 7 is a side elevational view of the protective cover according to an alternative embodiment of the present invention in use on a reinforcing bar.

DETAILED DESCRIPTION OF THE PREFERRED EMBODIMENT

The protective cover of the present invention is believed to meet both current OSHA standards as well as proposed OSHA standards relating to protective covers for reinforcing bars.

Figure 1:
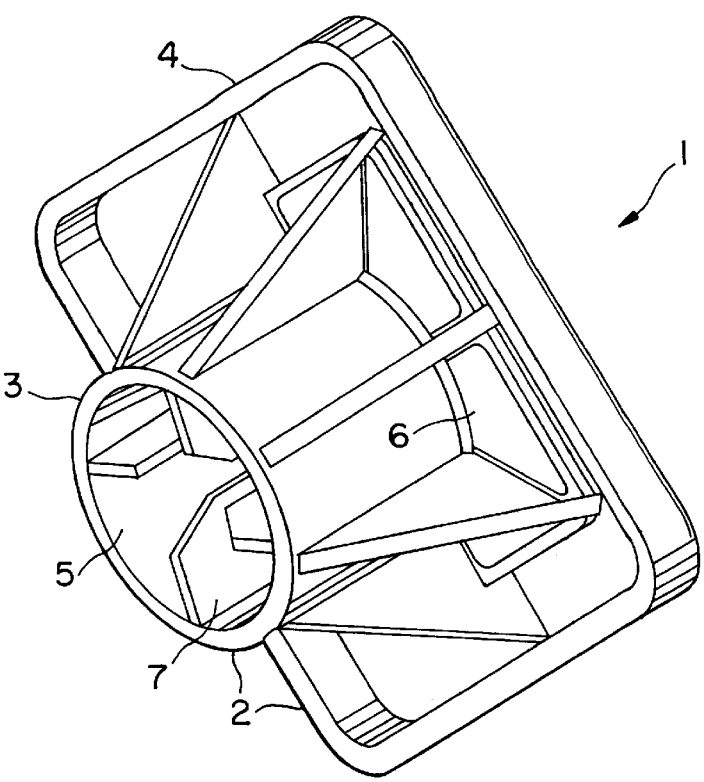
FIG. 1 is a bottom perspective view of the protective cover of the present invention.

FIG. 1 is a bottom perspective view of protective cover 1. Protective cover 1 comprises an integrally formed cap-and-collar assembly 2 which is injection-molded around metal seat 6. Cap-and-collar assembly 2 includes collar section 3 and cap section 4. Cap-and-collar assembly 2 is preferably made out of a resiliently-deformable, plastic material such as heavy-duty polyethylene plastic. The material used for cap and collar assembly 2 preferably should be brightly colored so that it can be readily seen when in use on a reinforcing bar.

As shown in FIG. 1, collar section 3 has open end 5 for receiving the reinforcing bar. Collar section 3 includes inwardly extending and off-center fins 7 which secure the reinforcing bar (not shown) to the protective cover 1. Fins 7 flex outwardly so as to accommodate reinforcing bars of varying sizes, and fins 7 are set off-center so as to facilitate installation on the bars with a twisting motion.

Figure 2:
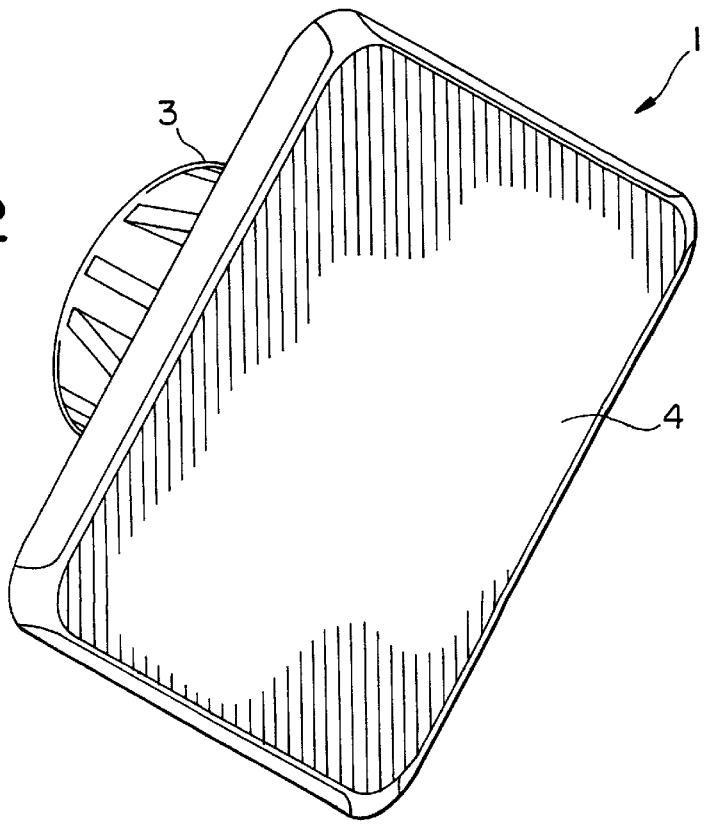
FIG. 2 is a top perspective view of the protective cover.

FIG. 2 is a top side perspective view of protective cover 1. As shown in FIG. 2, cap section 4 has a flat squared surface having rounded edges. The dimensions of cap section 4 are designed to meet the proposed OSHA standard for protective covers and, preferably, the cap has a 4"×4"-square surface area. As noted previously, collar section 3 and cap section 4 preferably are made from the same material, such as resiliently deformable plastic material which is brightly colored.

Figure 3:
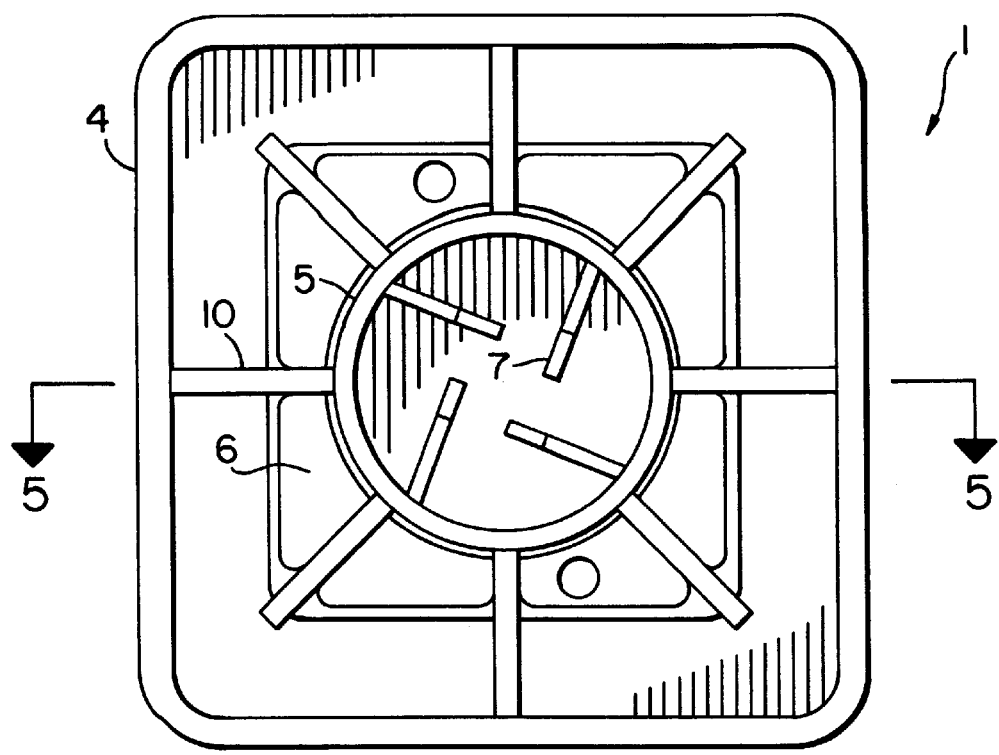
FIG. 3 is a bottom plan view of the protective cover.

FIG. 3 is a bottom plan view of protective cover 1. As shown in FIG. 3, eight radially-extending reinforcing ribs 10 circle collar section 3. Reinforcing ribs 10 not only provide connectivity between collar section 3 and cap section 4, but also provide rigidity and structural integrity for cap-and-collar assembly 2. The effect of reinforcing ribs 10 prevents collar section 3 from separating from cap section 4 when a load is dropped or placed against cap section 4, for example, a load equivalent to the impact of a person striking against the protective cover. Preferably, reinforcing ribs 10 are integrally formed, such as by injection molding, from a single material with collar section 3 and cap section 4. In this fashion, metal seat 6 can be integrally molded between collar section 3, cap section 4, and reinforcing ribs 10.

Figure 4:
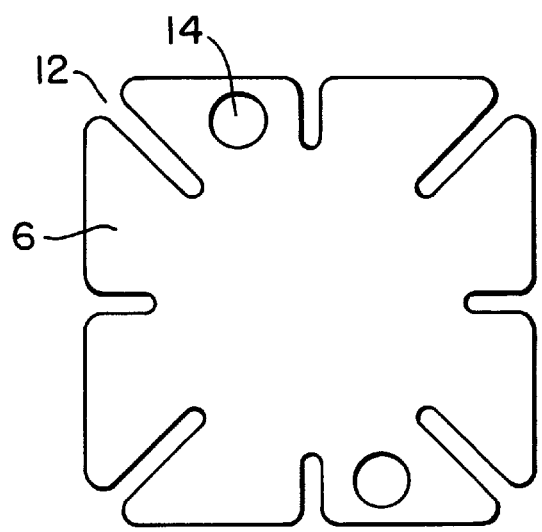
FIG. 4 is a plan view of the metal seat which has slot-shaped cut-out regions for preventing direct attachment to the reinforcement ribs of the protective cover.

FIG. 4 is a front view of metal seat 6. As shown in FIG. 4, metal seat 6 includes cut-out slots 12 which permit reinforcing ribs 10 to pass from cap section 4 to collar section 3. Metal seat 6 also includes mounting holes 14 which are used for proper alignment of metal seat 6 within an injection mold. Metal seat 6 should be made from a rigid metal material and should have an appropriate thickness that would prevent penetration of the reinforcing bar through the cover when impacted with a 250 pound weight dropped from a height of 10 feet. Preferably, metal seat 6 is ⅛ inches thick and is manufactured from hot-rolled A36 steel.

FIG. 5 is a longitudinal cross-section of protective cover 1 taken along line 5—5 of FIG. 3. As shown in FIG. 5, metal seat 6 is placed at the distal end of collar section 3 at the point at which collar section 3 meets cap section 4. In this manner, when the reinforcing bar is placed in the open end 5 of collar section 3, it will abut against metal seat 6.

FIG. 6 is a side elevational view of a preferred embodiment of the protective cover in accordance with the present invention. As shown in FIG. 6 and as discussed above with respect to FIGS. 1 and 2, protective cover 1 has a flat square surface. Also shown in FIG. 6 is the preferred manner of mounting protective cover 1 onto a reinforcing bar.

FIG. 7 is a side elevational view of protective cover 1 according to an alternative embodiment of the present invention. As shown in FIG. 7, cap section 4 of protective cover 1 has a mushroom or semi-circular surface area 16.

A method for manufacturing protective cover 1 will now be described. Protective cover 1 is manufactured by an injection molding process. However, prior to performing the injection molding, metal seat 6 is placed into an injection mold. Metal seat 6 is properly aligned and fixed within the mold by aligning mounting holes 14 on mounting pins within the mold. Once the metal seat 6 is properly affixed in the mold, the mold is sealed and molten plastic is injected into the mold via an injection inlet. After the plastic has cooled, the mold is separated and protective cover 1 is removed.

In operation, when protective cap 1 is placed over a reinforcing bar, the reinforcing bar enters open end 5 of collar section 3. Collar section 3 receives the end of the reinforcing bar and the inwardly extending and off-center fins 7 spread apart so as to accommodate and to secure the bar to protective cover 1. Protective cover 1 is pressed firmly downward onto the bar until the bar is seated against metal seat 6. Fins 7 detachably retain the reinforcing bar within protective cover 1 until such time that the protective cover has served its purpose. At such time, protective cover 1 can be removed from the reinforcing bar by pulling in an upward direction away from the reinforcing bar.

In the case that a worker comes in contact with the protective cover, the load or force against the protective cover will be distributed through cap section 4 and metal seat 6 directly to the reinforcing bar. On the other hand, if an off-center load or force impacts the cover, the load will be distributed from cap section 4 to metal seat 6 and reinforcing ribs 10 to collar section 3. The foregoing design prevents a penetration failure as well as a failure due to the load or force shearing-off cap 4 from collar section 3.

What is claimed is:

1. A concrete reinforcing bar protective cover for covering an end of a concrete reinforcing bar so as to prevent injuries to an individual caused by coming into contact with the end of the concrete reinforcing bar, said concrete reinforcing bar protective cover comprising:

a cylindrical collar, said cylindrical collar dimensioned to receive the end of concrete reinforcing bars of varying sizes and at least a portion of said collar having inwardly extending fins for releasably securing the end of the concrete reinforcing bar to the concrete reinforcing bar protective cover; and a cap, said cap having an exposed top surface and exposed sides constructed so as to prevent injury to any individual coming into contact with the exposed top surface and exposed sides, said exposed top surface having an area of at least about sixteen square inches, and said cap having an underside which is attached perpendicularly to said collar, said cap having both molded ribs and a reinforced central area and, said reinforced central area capable of withstanding an impact of a 250 pound weight without a penetration failure caused by the concrete reinforcing bar, wherein said reinforced central area is disposed between an end of the cylindrical collar and the exposed top surface of the cap.

2. A concrete reinforcing bar protective cover according to claim 1, wherein said reinforced central area comprises a metal seat disposed adjacent and beneath an underside of the cap, and wherein the metal seat covers an area which is greater than a diameter of the concrete reinforcing bar.

3. A concrete reinforcing bar protective cover according to claim 1, wherein said collar has a constant diameter.

4. A concrete reinforcing bar protective cover according to claim 1, wherein the inwardly extending fins flex outwardly so as to accommodate bars of varying sizes.

5. A concrete reinforcing bar protective cover according to claim 1, wherein the concrete reinforcing bar protective cover is a single-molded body.

6. A concrete reinforcing bar protective cover according to claim 1, wherein the exposed top surface is a flat square shape.

7. A concrete reinforcing bar protective cover according to claim 1, wherein the exposed top surface is dome shaped.

8. A protective cover for covering an end of a concrete reinforcing bar so as to prevent injuries to an individual caused by coming into contact with the end of the concrete reinforcing bar, said protective cover comprising:

a cylindrical collar, said cylindrical collar dimensioned to receive the end of the concrete reinforcing bar and at least a portion of said collar having means for releasably securing the end of the concrete reinforcing bar to the protective cover; and a cap, said cap having an exposed top surface and exposed sides constructed so as to prevent injury to an individual coming into contact with the exposed top surface and exposed sides, said cap having an underside which is arranged perpendicularly to said collar and having a molded reinforced central area capable of withstanding an impact of a 250 pound weight without a penetration failure caused by the concrete reinforcing bar, the molded reinforced central area being disposed between an end of the cylindrical collar and the exposed top surface of said cap.

9. A protective cover according to claim 8, wherein said collar has a constant diameter.

10. A protective cover according to claim 8, wherein the protective cover is a single-molded body.

11. A protective cover according to claim 8, wherein the reinforced central area comprises a seat, the seat being disposed adjacent and beneath the underside of the cap.

12. A protective cover according to claim 8, wherein the reinforced central area is reinforced with ribs.

13. A protective cover according to claim 8, wherein the exposed top surface is a flat square shape.

14. A protective cover according to claim 8, wherein the exposed top surface is dome shaped.

15. A concrete reinforcing bar protective cover for covering an end of a concrete reinforcing bar so as to prevent injuries to an individual caused by coming into contact with the end of the concrete reinforcing bar, said concrete reinforcing bar protective cover comprising:

a collar, the collar adapted to be receive concrete reinforcing bars of varying sizes; and a cap, said cap having an exposed top surface constructed so as to prevent injury to an individual coming into contact with the exposed top surface, said cap having an underside which is attached perpendicularly to said collar, said cap having both molded ribs and a reinforced central area, and the reinforced central area capable of withstanding an impact of a 250 pound weight without a penetration failure caused by the concrete reinforcing bar, wherein said reinforced central area is disposed between an end of the collar and the exposed top surface of the cap.

16. A concrete reinforcing bar protective cover according to claim 15, wherein said cylindrical collar has a constant diameter.

17. A concrete reinforcing bar protective cover according to claim 15, wherein the concrete reinforcing bar protective cover is a single-molded body.

18. A concrete reinforcing bar protective cover according to claim 15, wherein the reinforced central area comprises a metal seat, the metal seat being disposed adjacent and beneath the underside of the cap.

19. A concrete reinforcing bar protective cover according to claim 15, wherein the exposed top surface is a flat square shape.

20. A concrete reinforcing bar protective cover according to claim 15, wherein the exposed top surface is dome-shaped.

21. A concrete reinforcing bar with a protective cover for covering an exposed end of the concrete reinforcing bar so as to prevent injuries to an individual caused by coming into contact with the exposed end of the concrete reinforcing bar, comprising:

a concrete reinforcing bar;

a collar, the collar dimensioned to receive the exposed end of the concrete reinforcing bar and at least a portion of the collar having inwardly extending fins releasably securing the exposed end of the concrete reinforcing bar to the protective cover; and a cap, the cap having an exposed top surface and exposed sides, the cap having an underside attached perpendicularly to the collar and having both molded ribs and a reinforced central area capable of withstanding an impact of a 250 pound weight without a penetration failure caused by the concrete reinforcing bar, the reinforced central area is disposed between an end of the collar and the exposed top surface of said cap.

22. A concrete reinforcing bar with a protective cover according to claim 21, wherein the reinforced central area comprises a metal seat disposed adjacent and beneath an underside of the cap, and wherein the metal seat covers an area which is greater than a diameter of the concrete reinforcing bar.

23. A concrete reinforcing bar with a protective cover according to claim 21, wherein the exposed top surface is a flat square shape.

24. A concrete reinforcing bar with a protective cover according to claim 21, wherein the exposed top surface is dome-shaped.

* * * * *

UNITED STATES PATENT AND TRADEMARK OFFICE
CERTIFICATE OF CORRECTION

PATENT NO. : 5,946,871

DATED : September 7, 1999

INVENTORS : Vasken Kassardjian, et al.

It is certified that error appears in the above-identified patent and that said Letters Patent is hereby corrected as shown below:

COLUMN 5

Line 28, "be" should be deleted; and
Line 42, "cylindrical" should be deleted.

Signed and Sealed this

Twenty-fourth Day of October, 2000

Attest:

Q. TODD DICKINSON

*Attesting Officer*            *Director of Patents and Trademarks*